United States Patent [19]
Po' et al.

[11] Patent Number: 5,334,343
[45] Date of Patent: * Aug. 2, 1994

[54] POLYESTER COMPOSITIONS WITH A HIGH CRYSTALLIZATION RATE

[75] Inventors: Riccardo Po'; Ernesto Occhiello, both of Novara; Giorgio Giannotta, Milan; Fabio Garbassi, Novara, all of Italy

[73] Assignee: Enichem S.p.A., Milan, Italy

[*] Notice: The portion of the term of this patent subsequent to Jan. 11, 2011 has been disclaimed.

[21] Appl. No.: 850,041

[22] Filed: Mar. 12, 1992

[30] Foreign Application Priority Data

Mar. 18, 1991 [IT]   Italy .................... MI 91 A 000712

[51] Int. Cl.$^5$ .................................... B29C 45/00
[52] U.S. Cl. .................... 264/328.1; 525/437; 525/444; 264/239; 264/328.14; 264/331.11
[58] Field of Search ............ 525/437, 444; 264/239, 264/328.1, 328.14, 331.11

[56] References Cited

U.S. PATENT DOCUMENTS

4,695,649  9/1987  Magami et al. .

FOREIGN PATENT DOCUMENTS

0214581  3/1987  European Pat. Off. .

OTHER PUBLICATIONS

CA110(22):193718m.
CA108(16):132569a.
CA106(12):5790z.
Patent Abstracts of Japan, vol. 4, No. 129(C-24)(611), Sep. 10, 1980, & JP-A-55-82150, Jun. 20, 1890, H. Iida, et al., "Polyester Compositions".
Patent Abstracts of Japan, vol. 12, No. 391(C-537)(3238), Oct. 18, 1988, & JP-A-63-137950, Jun. 9, 1988, H. Naito, "Polyester Resin Composition and Production Thereof".
Markromol. Chemical, vol. 186, No. 8, Aug. 1985, pp. 1575-1591, A. Y. Bilibin, et al., "Thermotropic Polyesters, 2. Synthesis of Regular Polyesters From Aromatic Dicarboxylic Acids and Phenols or Aliphatic Diols, and Study of Their Mesomorphic Properties".

*Primary Examiner*—Samuel A. Acquah
*Attorney, Agent, or Firm*—Oblon, Spivak, McClelland, Maier & Neustadt

[57] ABSTRACT

Polyester compositions with a high crystallization rate obtained by mixing, at a high temperature, a polyester resin with at least one organic compound having the general formula:

$$ROOC-Ar-OOC-Ar'-COO-Ar-COOR \qquad (I)$$

where R represents a hydrogen atom or a $C_1$-$C_4$ alkyl radical whereare Ar and Ar', either the same or different, represent a simple or condensed aromatic radical containing from 6 to 12 carbon atoms, and cooling the mixture thus obtained to room temperature.

10 Claims, 1 Drawing Sheet

POLYESTER COMPOSITIONS WITH A HIGH CRYSTALLIZATION RATE

FIELD OF THE INVENTION

The present invention relates to polyester compositions with a high crystallization rate and the procedure for their preparation.

More specifically, the present invention relates to polyester compositions with a high crystallization rate obtained by using, as a nucleant, some organic compounds having the general formula:

ROOC—Ar—OOC—Ar'—COO—Ar—COOR    (I)

where R represents a hydrogen atom or a $C_1$-$C_4$ alkyl radical and Ar and Ar' represent aromatic radicals.

BACKGROUND OF THE INVENTION

Compounds having general formula (I) are well-known in the art as comonomers for the preparation of crystalline liquid polyesters and their synthesis is described in Chemical Abstracts, vol. 97, No. 72969, 1982, in Chemical Abstracts, vol. 99, No. 218533, 1983 and in Makromolecular Chemistry, Rapid Commun., 6, 209, 1985.

In these references the Ar' radical represents substituted phenyl groups in various positions or substituted naphthalene groups in position 2,6. Ar is invariably a substituted phenyl group in position 1,4 and R represents a hydrogen atom or methyl radical.

U.S. Pat. No. 4,695,649 describes the preparation of di-(p-benzyloxycarbonylphenyl)isophthalate, and its repellent action with respect to insects, and the preparation of di-(p-octyloxycarbonylphenyl) isophthalate and its use as a plasticizer with respect to polyamides.

SUMMARY OF THE INVENTION

The Applicant has now found that compounds corresponding to general formula (I) have surprising nucleant properties for polyester resins, in particular for polyethyleneterephthalate.

DETAILED DESCRIPTION OF THE INVENTION

Figure 1:
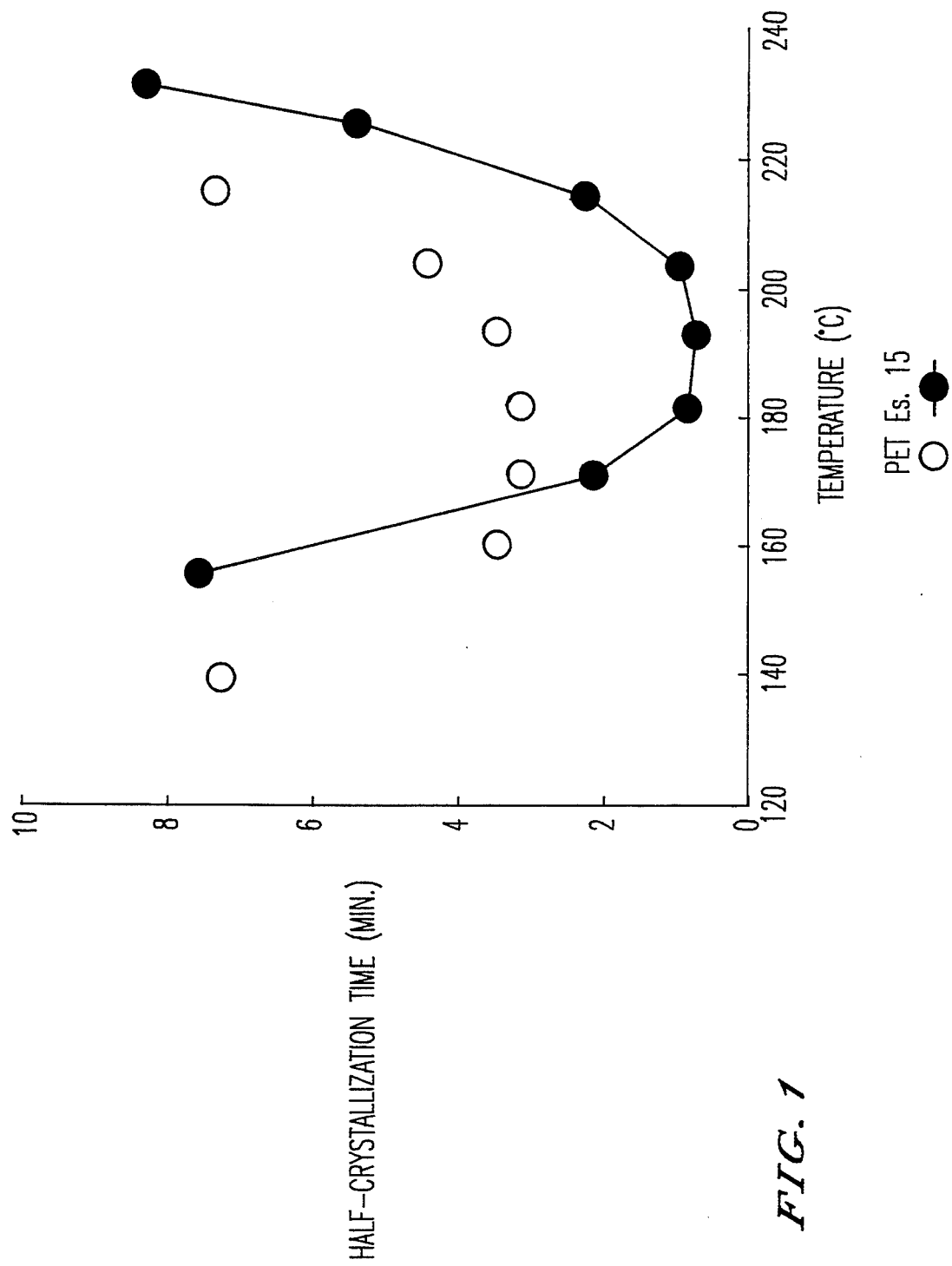

The present invention consequently relates to polyester compositions with a high crystallization rate obtained by mixing, at a high temperature, a polyester resin with at least one organic compound having the general formula:

ROOC—Ar—OOC—Ar'—COO—Ar—COOR    (I)

where R represents a hydrogen atom or a $C_1$-$C_4$ alkyl radical whereas Ar and Ar', either the same or different, represent a simple or condensed aromatic radical containing from 6 to 12 carbon atoms, and by cooling the mixture thus obtained to room temperature.

Preferred compositions in accordance with the present invention are those obtained from compounds corresponding to general formula (I) where R represents a methyl radical whereas Ar and Ar' represent respectively:

a phenyl group having the functional groups in position 1,2 or a naphthalene group with the functional groups in position 1,2 or 2,3 or 2,6; and a phenyl group or a naphthalene group having the functional groups in any position.

Compositions in accordance with the present invention even more preferred are those obtained by mixing with the polyester resin from 0.5 to 10% by weight, of the total mixture, of the organic compound corresponding to general formula (I).

Any polyester resin may be used in the compositions of the present invention even if it is preferable to use polyethyleneterephthalate resins (PET), polybutylene terephthalate resins (PBT) and polyethylenenaphthalate resins (PEN).

The mixing of the polyester resin with the nucleant corresponding to general formula (I) is carried out at a high temperature, or more specifically, at temperatures corresponding to the melting point of the resin. Temperatures ranging from 250° to 330° C. are most suitable for the present invention.

The organic compounds corresponding to general formula (I) can be obtained with the techniques described in the previously mentioned references. For example, these compounds can be obtained by means of the condensation reaction of an aroyl dihalide, such as aroyl dichloride ClOC—Ar'—COCl, with an aromatic acid (or corresponding aliphatic ester) containing a substituent hydroxylic group in one of the remaining positions of the ring, in the presence of aliphatic or aromatic, chlorinated or ether-type hydrocarbon solvents, and in the presence of bases such as acceptors of developed halogenic acid.

The reaction is generally carried out in anhydrous dioxane, in the presence of pyridine, or in pure pyridine. The reaction starting from non-esterified hydroxyacid to obtain salt or the acid is preferably carried out in a biphasic system of chlorinated solvent (methylene chloride, chloroform or carbon tetrachloride)/alkaline aqueous solution (based on NaOH or KOH).

The polyester compositions of the present invention are suitable for use in the production of moulded products which can be prepared with the normal transformation technologies of thermoplastic polymers such as, for example, injection moulding or extrusion, they can be processed in the form of films or fibers, they can be used as matrixes for composite materials based on fibers or inorganic charges and can also be used in mixtures with other polymers.

A procedure for preparing the polyester compositions with a high crystallization rate of the present invention involves:

mixing at a high temperature a polyester resin with at least one organic compound having the general formula

ROOC—Ar—OOC—Ar'—COO—Ar—COOR    (I)

where R, Ar an Ar' have the previously defined meaning; and cooling the mixture thus obtained to room temperature.

For the procedure of the present invention it is preferable for both the mixing stage under heat and the cooling stage, to be carried out in a single apparatus, such as an extruder equipped with a pelletizing head.

DESCRIPTION OF THE PREFERRED EMBODIMENTS

The examples which follow are intended to illustrate and clarify the present invention but do not limit it in any way.

EXAMPLE 1

Preparation of dimethyl 4,4'-(terephthaloyldioxy) dibenzoate 78.0 g of terephthaloyl chloride and 480 ml of dioxane were charged into a 1 liter flask. A solution of 116.8 g of methyl p-hydroxybenzoate in 150 ml of pyridine was added dropwise to the solution cooled to 15° C. After 6 hours of stirring at room temperature the reaction mixture was reflux heated for 6 hours, cooled and poured into 1.2 liters of 5% HCl (aqueous solution) at 0° C.

The solid precipitate was then suspended in an aqueous solution of 1% NaOH and water, filtered and dried in an oven under vacuum at 50° C.

160.0 g (96.0%) of a powdery white solid were obtained, with a melting point (m.p.) of 248° C. (elemental analysis: C=66.01%; H=4.11%).

EXAMPLE 2

Preparation of dimethyl 4,4'-(isophthaloyldioxy)dibenzoate 105.4 g of isophthaloyl chloride and 700 ml of dioxane were charged into a 2 liter flask. A solution of 155.7 g of methyl p-hydroxybenzoate in 150 ml of pyridine was added dropwise to the solution cooled to 15° C. After 6 hours of stirring at room temperature, the reaction mixture was reflux heated for 6 hours, cooled and poured into 1.5 liters of 7% HCl at 0° C.

The solid precipitate was suspended in 5% HCl in 5% NaHCO$_3$ (aqueous solution), washed with water, filtered and dried in an oven under vacuum at 50° C.

210.0 g (94.6%) of a powdery white solid were obtained having a m.p. of 223° C. (elemental analysis: C=66.46%; H=4.17%).

EXAMPLE 3

Preparation of dimethyl 3,3'-(terephthaloyldioxy)di-2,2'-naphthoate 40.2 g of terephthaloyl chloride and 280 ml of dioxane were charged into a 1 liter flask. A solution of 80.0 g of methyl 3-hydroxy-2-naphthoate in 70 ml of pyridine and 30 ml of dioxane was added dropwise to the solution cooled to 15° C. After 6 hours of reflux stirring, the mixture was cooled and poured into 1.5 liters of 5% HCl at 0° C The solid precipitate was suspended in 1% NaOH, washed with water, filtered and dried in an oven under vacuum at 60° C.

95.0 g (89.9%) of a powdery white solid were obtained, having a m.p. of 299° C. (elemental analysis: C=71.42%; H=4.14%).

EXAMPLE 4

Preparation of dimethyl 4,'4-(phthaloyldioxy)dibenzoate 151.4 g of phthaloyl chloride and 900 ml of dioxane were charged into a 2 liter flask. A solution of 226.9 g of methyl p-hydroxybenzoate in 220 ml of pyridine and 60 ml of dioxane was added dropwise to the solution cooled to 15° C. After 4 hours of reflux stirring, the mixture was cooled and poured into 5 liters of water at 0° C.

The solid precipitate was suspended in 5% HCl, in water, in methanol, filtered and dried in an oven under vacuum at 60° C.

292.1 g (90.2%) of a powdery white solid were obtained, having a m.p. of 127° C. (elemental analysis: C=67.12%; H=4.01%).

EXAMPLE 5

Preparation of dimethyl 2,2'-(terephthaloyldioxy) dibenzoate 99.7 g of methyl salicylate, 50 ml of dioxane and 67 ml of pyridine were charged into a 1 liter flask. A solution of 66.5 g of terephthaloyl chloride in 470 ml of dioxane was added dropwise to the solution cooled to 15° C. After 6 hours of reflux stirring, the reaction mixture was cooled and poured into 1.5 liters of 5% HCl at 0° C.

The solid precipitate was suspended in 5% HCl in 5% NaHCO$_3$, in 2% KOH, in water, in methanol, filtered and dried in an oven under vacuum at 70° C.

102.0 g (71.9%) of an off-white powdery solid were obtained, having a m.p. of 142° C. (elemental analysis: C=66.81%; H=4.12%).

EXAMPLE 6

Preparation of 4,4'-(terephthaloyldioxy)dibenzoic acid 58.6 g of terephthaloyl chloride and 400 ml of dioxane were charged into a 1 liter flask. A suspension of 79.1 g of p-hydroxybenzoic acid in 120 ml of pyridine was added to the solution cooled to 15° C. After 4 hours of vigorous stirring at room temperature, the reaction mixture was reflux heated for 16 hours, cooled and poured into 2 liters of 10% HCl at 0° C.

The solid precipitate was suspended in 5% NaHCO$_3$, in water, filtered and dried in an oven under vacuum at 50° C.

112.3 g (95.7%) of a powdery white solid were obtained (elemental analysis. C=64.85%; H=3.47%).

EXAMPLE 7

Preparation of a mixture of 4,4'-(terephthaloyldioxy) -dibenzoic acid and monosodic* 4,4'-(terephthaloyldioxy) -dibenzoate 38.1 g of p-hydroxybenzoic acid and 750 ml of NaOH 1M. were charged into a 2 liter flask. 22.1 g of terephthaloyl chloride dissolved in 300 ml of dichloroethane were added dropwise under vigorous stirring.

After 5 hours of reaction, the mixture was filtered and the solid washed with acetone, suspended in 5% HCl, filtered again and dried under vacuum at 70° C.

45.9 g of a powdery white solid were obtained (elemental analysis: C=59.8%; H=2.9%; Na=7.6%).

EXAMPLE 8

Preparation of dimethyl 6,6'-(isophthaloyldioxy)di-2,2'-naphthoate 60.9 g of isophthaloyl chloride and 500 ml of dioxane were charged into a 1 liter flask. A solution of 121.2 g of methyl 6-hydroxy-2-naphthoate in 100 ml of pyridine and 50 ml of dioxane was added dropwise to the solution. After 8 hours of reflux stirring, the mixture was cooled and poured into 1.5 liters of 5% HCl at 0° C.

The solid precipitate was suspended in 5% HCl, in 5% NaHCO$_3$, in water, filtered and dried in an oven under vacuum at 60° C.

157.4 g (98.3%) of a powdery white solid were obtained, having a m.p. of 254° C.

EXAMPLES 9-19

The compounds of the previous examples were mixed with PET having a viscosity of 0.64 produced by the company Montefibre of Milan.

The polymer, dried for 8 hours at 120° C., was pre-mixed dry in a V mixer with the above* compound in powder form.

After a mixing time of 15 minutes, 500 g of the mixture were fed into a MV19L single-screw extruder of Comacplast (VA) of Cerromaggiore, Italy, with a diameter of 19 mm and screw length of 25 diameters.

The screw speed was fixed at 70 rpm and a thermal profile of between 250° and 280° C., corresponding to the hopper and extrusion head respectively. The extruded product at the nozzle outlet was cooled in water and then pelletized.

Table 1 shows the relative quantities of additive for each mixture, the melting point and inherent viscosity, measured in phenol/tetrachloroethane 60/40 at 30° C., of the material obtained.

Table 2 shows the crystallization temperatures $T_{ch}$ and $T_{cc}$ obtained, by differential scanning calorimetry, using a DSC7 apparatus by Perkin Elmer and data relating to an unmixed PET with a viscosity of 0.64 are used as a comparison.

There is a substantial increase in the $T_{cc}$ and decrease in the $T_{ch}$ with respect to the unmodified material.

The $T_{cc}$ indicates the peak hexothermal crystallization temperature obtained by means of DSC by melting the material and subsequently slowly decreasing the temperature (10° C./min). The $T_{ch}$ indicates the peak hexothermal crystallization temperature obtained by means of DSC by melting the material, bringing it quickly to below the glass transition temperature, to keep it amorphous, and then slowly increasing the temperature (20° C./min).

EXAMPLE 20

Crystallization kinetics were obtained on the reference PET and composition of Example 15. These were derived from DSC measurements using the following procedure:

the sample was heated to 280° C. and kept at melting state for 2 minutes, to destroy any crystalline center;

the temperature was rapidly decreased (150° C./min) to the required values;

at a constant temperature, the thermal exchange values were recorded in relation to the time;

the half-crystallization time was considered as being that corresponding to an area equal to half of the typical hexothermal crystallization peak.

FIG. 1 shows the half-crystallization times of the reference PET and composition of Example 15 in relation to the temperature. In the latter case, there is a drastic reduction of the half-crystallization times which corresponds with a definite increase in the crystallization rate. The temperature range where there is a high crystallization rate is also increased with the relative advantages in the moulding phase.

TABLE 1

| Example | Addit. | Quant. (% weight) | Tm (:C.) | (dl/g) |
|---|---|---|---|---|
| 9 | — | — | 252 | 0.45 |
| 10 | as ex. 1 | 1 | 251 | 0.55 |
| 11 | as ex. 2 | 1 | 251 | 0.60 |
| 12 | as ex. 3 | 1 | 252 | 0.55 |
| 13 | as ex. 5 | 1 | 253 | 0.53 |
| 14 | as ex. 1 | 2.25 | 256 | 0.46 |
| 15 | as ex. 2 | 2.25 | 257 | 0.50 |
| 16 | as ex. 3 | 2.75 | 255 | 0.44 |
| 17 | as ex. 5 | 2.25 | 257 | 0.42 |
| 18 | as ex. 4 | 2.25 | 255 | 0.50 |
| 19 | as ex. 3 | 5 | 252 | n.d. |

TABLE 2

| Example | $T_{ch}$(°C.) | $T_{cc}$(°C.) |
|---|---|---|
| 9 | 171 | 177 |
| 10 | 137 | 194 |
| 11 | 137 | 197 |
| 12 | 138 | 198 |
| 13 | 139 | 201 |
| 14 | 139 | 201 |
| 15 | 141 | 200 |
| 16 | 133 | 205 |
| 17 | 136 | 205 |
| 18 | 140 | 202 |
| 19 | 136 | 203 |

We claim:

1. Polyester compositions with a high crystallization rate obtained by mixing, at a high temperature, a polyester resin with at least one organic compound having the general formula:

ROOC—Ar—OOC—Ar'—COO—Ar—COOR    (I)

where R represents a hydrogen atom or a $C_1$-$C_4$ alkyl radical, Ar represents a 1,2-phenylene or a naphthylene group, and Ar' represents a phenylene or naphthylene group, at least one of Ar and Ar' being naphthylene.

2. Compositions in accordance with claim 1, wherein R represents a methyl radical, and Ar represents a 1,2-phenylene group or a 1,2 or 2,3 or 2,6-naphthylene group.

3. Compositions in accordance with claims 1 or 2, wherein from 0.5 to 10% by weight, of the total mixture, of the organic compound corresponding to general formula (I) are added to the polyester resin.

4. Compositions in accordance with claims 1 or 2, wherein the polyester resin is polyethylene terephthalate (PET), polybutylene-terephthalate (PBT) or polyethylenenaphthalate (PEN).

5. Compositions in accordance with claims 1 or 2, wherein the mixing of the polyester resin with the compound having general formula (I) is carried out at temperatures at which the resin is in the molten state.

6. Process for the preparation of molded products comprising molding a polyester composition with a high crystallization rate obtained by mixing, at a high temperature, a polyester resin with at least one organic compound having the general formula:

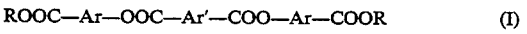

ROOC—Ar—OOC—Ar'—COO—Ar—COOR    (I)

where R represents a hydrogen atom or a $C_1$-$C_4$ alkyl radical, Ar represents a 1,2-phenylene or a naphthylene group, and Ar' represents a phenylene or naphthylene group, at least one of Ar and Ar' being naphthylene, and cooling the mixture thus obtained to room temperature.

7. Process for improving the crystallization rate of a polyester resin comprising:

mixing at a high temperature a polyester resin with at least one organic compound having the general formula

$$ROOC-Ar-OOC-Ar'-COO-Ar-COOR \quad (I)$$

where R is hydrogen or a $C_1$–$C_4$ alkyl radical, Ar represent a 1,2-phenylene group of a naphthylene group and Ar' represents a phenylene or naphthylene group, at least one of Ar and Ar' being naphthylene; and cooling the mixture thus obtained to room temperature.

8. Process in accordance with claim 7, wherein both the mixing stage at a high temperature and cooling, are carried out in an extruder equipped with a pelletizing head.

9. Process in accordance with claim 6, wherein the molding is by extrusion or injection molding.

10. Compositions in accordance with claim 1, wherein both Ar and Ar' are a naphthylene group.

* * * * *